US012200029B2

(12) United States Patent
Chan

(10) Patent No.: US 12,200,029 B2
(45) Date of Patent: Jan. 14, 2025

(54) METHOD OF AUTOMATICALLY PROCESSING CROSS-TYPE COMMUNICATION FOR MULTIPLE CONNECTIONS WITH A SINGLE ACCOUNT

(71) Applicant: Charles Lap San Chan, Taipei (TW)

(72) Inventor: Charles Lap San Chan, Taipei (TW)

( * ) Notice: Subject to any disclaimer, the term of this patent is extended or adjusted under 35 U.S.C. 154(b) by 76 days.

(21) Appl. No.: 18/176,846

(22) Filed: Mar. 1, 2023

(65) Prior Publication Data

US 2023/0283647 A1     Sep. 7, 2023

(51) Int. Cl.
*H04L 65/403* (2022.01)
*H04L 12/18* (2006.01)
*H04L 65/1069* (2022.01)
*H04L 65/1089* (2022.01)
*H04L 51/56* (2022.01)
*H04L 65/1083* (2022.01)

(52) U.S. Cl.
CPC ........ *H04L 65/403* (2013.01); *H04L 12/1818* (2013.01); *H04L 12/1822* (2013.01); *H04L 12/1831* (2013.01); *H04L 65/1069* (2013.01); *H04L 65/1089* (2013.01)

(58) Field of Classification Search
None
See application file for complete search history.

(56) References Cited

U.S. PATENT DOCUMENTS

| | | | | |
|---|---|---|---|---|
| 9,332,583 | B2 * | 5/2016 | Moon | H04W 76/23 |
| 11,336,706 | B1 * | 5/2022 | Saito | H04L 65/403 |
| 11,575,720 | B2 * | 2/2023 | Han | H04L 12/1822 |
| 2009/0089683 | A1 * | 4/2009 | Thapa | H04L 65/1089 |
| | | | | 715/756 |
| 2023/0143579 | A1 * | 5/2023 | Asgekar | H04L 12/1822 |
| | | | | 348/14.09 |

* cited by examiner

*Primary Examiner* — John A Follansbee
*Assistant Examiner* — Kamal M Hossain
(74) *Attorney, Agent, or Firm* — Muncy, Geissler, Olds & Lowe, P.C.

(57) ABSTRACT

In a method of automatically processing cross-type communication for multiple connections with a single account, a user only needs a single account to receive multiple connection requests, thereby connecting and communicating with multiple parties. In addition, the method can perform cross-type switching operation between different types of communication. For example, the method helps a user switch from in a voice-type communication mode to in a video-type communication mode. Furthermore, the method can also automatically execute some processing procedures according to parameters preset by the user and the current communication state of the user to provide the user with the convenience of communication before setting up a communication connection or switching the communication connection.

7 Claims, 2 Drawing Sheets

METHOD OF AUTOMATICALLY PROCESSING CROSS-TYPE COMMUNICATION FOR MULTIPLE CONNECTIONS WITH A SINGLE ACCOUNT

This application claims priority of application Ser. No. 11/107,512 filed in Taiwan on 2 Mar. 2022 under 35 U.S.C. § 119; the entire contents of all of which are hereby incorporated by reference.

BACKGROUND OF THE INVENTION

Field of the Invention

The present invention relates to a method for multiple connections with a single account, particularly to a method of automatically processing cross-type communication for multiple connections with a single account.

DESCRIPTION OF THE RELATED ART

In modern life, due to the development of personal communication devices and the increase of network bandwidth year by year, the frequency of communication among people is also increasing.

In the application of communication, it is commonly divided into types such as video communication, voice communication, and text communication. The different types of communication methods require different levels of user attention. For example, when a user chats with other friends by means of text communication, the amount of messages is not usually large, and the urgency of replying messages is not high. Thus, it is easy to chat with many friends by means of text communication at the same time. When the user chats with other people by means of voice communication, the urgency of response required by voice communication is usually higher than the urgency of response required by text communication regardless of the amount of messages. For another example, when a user communicates with other people by means of video communication, both parties need to focus more on the conversation and pay more energy to communicate with each other since the images and voices of both parties appear at the same time.

However, in the currently known communication methods, few applications that allow users to communicate with multiple parties are provided. In other words, service providers in the market have not found that users may also need to communicate with multiple objects.

Accordingly, how to enable users in need to communicate with multiple different objects, even across different types of communication, has become the researching direction of those skilled in the art.

SUMMARY OF THE INVENTION

The primary objective of the present invention is to provides a method of automatically processing cross-type communication for multiple connections with a single account, which enables users to communicate with multiple different objects, even across different types of communication.

Another objective of the present invention is to provides a method of automatically processing cross-type communication for multiple connections with a single account, which automatically executes some processing procedures to provide convenience for the user in communication according to parameters preset by the user and the user's current communication state.

In order to achieve the foregoing objectives, the present invention provides a method of automatically processing cross-type communication for multiple connections with a single account applied to the environment of a communication server, a user device, and a plurality of client devices. The user device and the plurality of client devices are electrically connected to the communication device. The method includes:

Step (A): providing a communication-type quantity table, wherein the communication-type quantity table includes quantity of connections set by a user, and the quantity of connections corresponds to different communication types;

Step (B): by the user, operating the user device and a client device to set up a first communication connection and generate a first communication state;

Step (C): recording the first communication state in the communication server;

Step (D): by the communication server, receiving from another client device a connection request for the user device; and Step (E): by the communication server, automatically executing a processing procedure based on the communication-type quantity table, the first communication state, and a connection request from the another client device.

The features, advantages, or similar expressions mentioned in the specification do not mean that all the features and advantages that can be realized by the present invention should be in any single specific embodiment of the present invention. Rather, it should be understood that the expression of related features and advantages means that the specific features, advantages, or characteristics described in conjunction with specific embodiments are included in at least one specific embodiment of the present invention. Therefore, the discussion of features and advantages, and similar expressions in the specification is related to the same specific embodiment, but it is not necessary.

Below, the embodiments are described in detail in cooperation with the drawings to make easily understood the technical contents, characteristics and accomplishments of the present invention.

DETAILED DESCRIPTION OF THE INVENTION

In order to make the description of the present disclosure more detailed and complete, the following provides an illustrative description for the implementation aspects and specific embodiments of the present invention; but this is not the only way to implement or use specific embodiments of the present invention. The implementations cover the characteristics of specific embodiments and the steps and sequences of the method used to construct and operate these specific embodiments. However, other specific embodiments can also be used to achieve the same or equal functions and sequence of steps.

It should be noted that, unless otherwise specified, all functions described herein may be implemented in hardware or used as software instructions that enable a computer to perform predetermined operations, wherein the software instructions are implemented in a computer-readable storage media, such as a random-access memory (RAM), a hard disk drive, a flash memory, or other types of a computer-readable storage media known to those skilled in the art. In some embodiments, the predetermined operations of the computer are performed by a processor, such as a computer, or performed by program codes such as computer program codes or program codes of software or firmware. In some embodiments, the predetermined operations of the computer are performed by integrated circuits encoded to perform these functions. Furthermore, it should be understood that various operations described herein as being performed by a user may be performed manually by the user, or may be automatically performed with or without instructions provided by the user.

The present invention provides a method of automatically processing cross-type communication for multiple connections with a single account. In the communication method, a user only needs a single account to receive multiple connection requests, thereby connecting and communicating with multiple parties. In addition, the communication method can perform cross-type switching operation between different types of communication. For example, the communication method helps a user switch from in a voice-type communication mode to in a video-type communication mode. Furthermore, the method can also automatically execute some processing procedures according to parameters preset by the user and the current communication state of the user to provide the user with the convenience of communication before setting up a communication connection or switching the communication connection.

Figure 1:
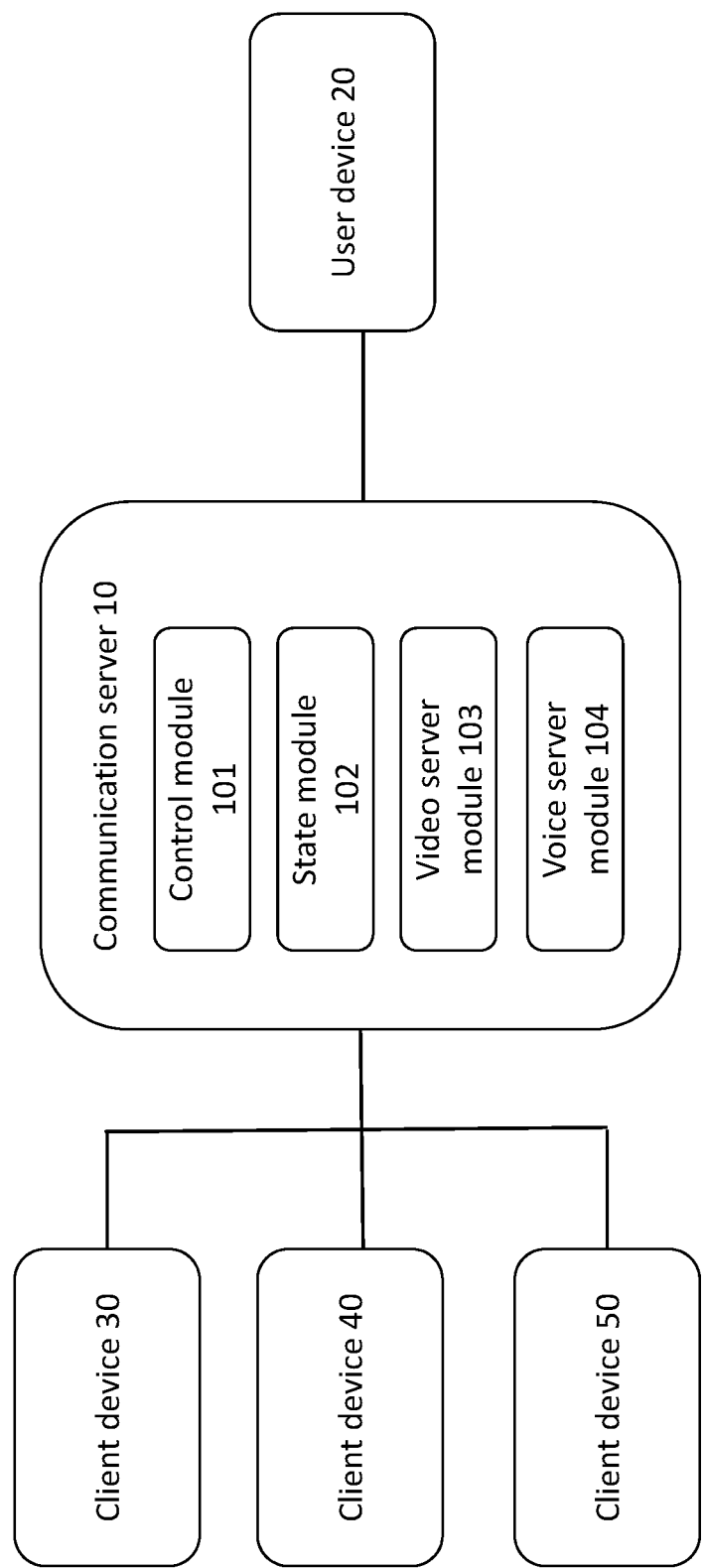
FIG. 1 is a schematic diagram illustrating a system of automatically processing cross-type communication for multiple connections with a single account according to a preferred embodiment of the present invention.

Please refer to FIG. 1. FIG. 1 is a schematic diagram illustrating a system of automatically processing cross-type communication for multiple connections with a single account according to a preferred embodiment of the present invention. The purpose of each device and the functional units in the system will be described first, and the operation process of the system will be further described later. In FIG. 1, the system includes a communication server 10, a user device 20, and a plurality of client devices 30, 40, and 50. The user device 20 and the plurality of client devices 30, 40, and 50 can be electrically connected to the communication server 10 via a network.

The user device 20 and the plurality of client devices 30, 40, 50 may be desktop computers, notebook computers, smart phones, conventional telephones, and the like. The user device 20 and the plurality of client devices 30, 40, and 50 may send communication connection requests to other devices, and may also receive communication connection requests to set up communication connections with other devices. In addition, when the user device 20 and the plurality of client devices 30, 40, and 50 are computers or smart phones, an application program or an APP can be installed in them. Through the application program or APP, setting commands can be further sent or inquiry messages, reminder messages, etc. can be received. When the user device 20 and the plurality of client devices 30, 40, and 50 are conventional phones, they can send setting commands by pressing buttons, or receive voices that include inquiry messages, reminder messages, etc. The present invention is not limited to the foregoing technical features.

The communication server 10 includes a control module 101, a state module 102, a video server module 103, and a voice server module 104. The control module 101 can be configured to receive from the client devices 30, 40, and 50 connection requests for the user device 20. Based on a combination of a communication-type quantity table, a first communication state, a communication-object priority table, and the connection requests from the client devices 30, 40, and 50, the control module 101 automatically executes a processing procedure. The control module 101 executes a user-specified procedure according to a first setting command.

The state module 102 can be configured to store the communication-type quantity table and the communication-object priority table. The communication-type quantity table includes the quantity of connections corresponding to different communication types, wherein the quantity of connections is set by the user. The content of the communication-type quantity table includes at least one or a combination of communication types and the quantity. The communication-object priority table includes priority levels set by the user, wherein the priority levels correspond to different communication objects. The content of the communication-object priority table includes at least one or a combination of communication objects and priority levels. The state module 102 is further configured to record a communication state.

The video server module 103 can be configured to set up video communication connections among the user device 20 and the client devices 30, 40, and 50. The voice server module 104 can be configured to set up voice communication connections among the user device 20 and the client devices 30, 40, and 50.

Figure 2:
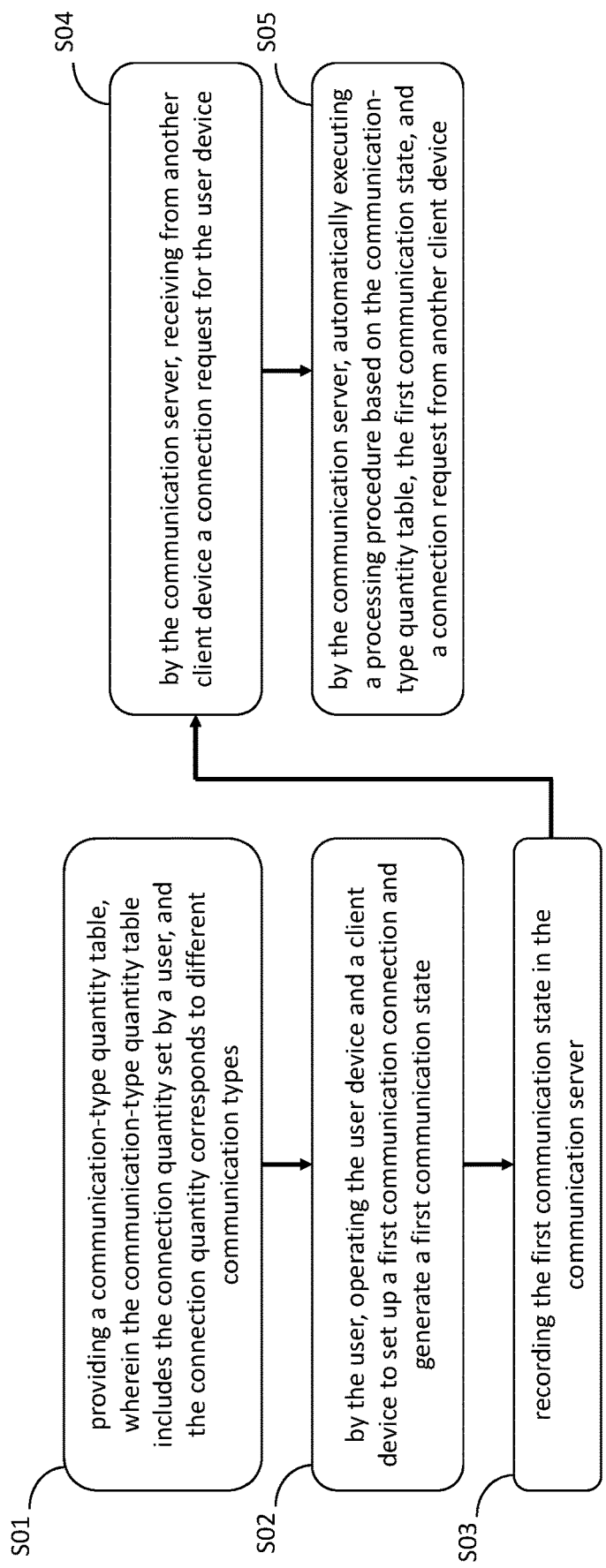
FIG. 2 is a flowchart of a method of automatically processing cross-type communication for multiple connections with a single account according to a preferred embodiment of the present invention.

FIG. 2 is a flowchart of a method of automatically processing cross-type communication for multiple connections with a single account according to a preferred embodiment of the present invention. For the following description, please refer to FIG. 1 and FIG. 2 at the same time. The use of each device will be described in detail in the flowchart below. It should be understood that the order of the steps in the flowchart can be changed according to different requirements, and that certain steps can be omitted.

Firstly, in Step S01, a communication-type quantity table is provided, wherein the communication-type quantity table includes the quantity of connections set by a user, and the quantity of connections corresponds to different communication types. In an embodiment of the present invention, the user may operate the user device 20 to provide the communication-type quantity table and store the communication-type quantity table in the state module 102. For example, the user can employ the user interface of the user device 20 to set the quantity of connections allowed for different communication types. For example, the quantity of connections allowed for voice communication is set to 3, and the quantity of connections allowed for video communication is set to 2. It should be understood that setting the quantity of connections allowed for voice communication to 3 does not mean that the user has a voice conversation with 3 connection objects at the same time. It means that the user may only have a voice conversation with one of the objects, but keep the voice communication connection with the other 2 objects, so that the user can switch to have a voice conversation with any one of the other 2 objects at any time. In Step S01, the user operates the user device 20 to provide a communication-object priority table and store the communication-object priority table in the state module 102. The communication-object priority table includes priority levels set by the user, wherein the priority levels correspond to different communication objects. For example, in one embodiment, the communication-object priority table records items that include client A, client B, and client C. The priority level of client A is high, the priority level of client B is normal, and the priority level of client C is normal. The application of the communication-object priority table will be further described later.

In addition, the user sets the quantity of connections allowed for video communication to 2, so that the user can set up the one-to-one video communication connection with each of the other two objects. The user can switch to have video communication with one of the two objects at any time but keep the video communication connection with another of the two objects. Alternatively, the user may set up one video communication connection to participate in a video meeting room where 8 persons connect and set up another one-to-one video communication connection with another person. It should be understood that the present invention does not limit the communication connection to one-to-one or one-to-many communication connections.

In Step S02, the user operates the user device and a client device to set up a first communication connection and generate a first communication state. The example of setting up a communication connection between the user device and a client device is introduced as follows. For example, in one embodiment of the present invention, the user intends to set up a video meeting room with several persons. As a result, the user sends a video connection request to the invited objects such as the client devices 30 and 40 via the communication server 10. When any one of them (e.g., the client device 30) responds to the request and sets up a first communication connection with the user, the first communication state will also be generated. That is to say, the user has set up a video communication connection. In addition, in Step S02, the user may operate the user device 20 to generate a first setting command for setting a user-specified procedure executed by the control module 101 of the communication server 10. The user-specified procedure may include at least one or a combination of setting an entry time limit for a group meeting room and setting the time interval of an invitation reminder for a group meeting room. The application of the user-specified procedure will be further described later.

The example of setting up a communication connection between the user device and a client device is introduced as follows. In another embodiment of the present invention, the user of a client device (e.g. client device 30) may call the user of the user device 20 and expect to set up a communication connection with the user device 20. Thus, the user of the called end operates the user device 20 to set up a first communication connection with the client device 30 and generate a first communication state. It should be understood that the first communication connection may be a video communication connection or a voice communication connection. On top of that, in a communication connection, the user may set up a communication connection with one or more other users.

In Step S03, the first communication state is recorded in the communication server 10. In an embodiment of the present invention, the state module 102 of the communication server 10 records the first communication state in the communication server 10. Thus, it can be determined whether the quantity of connections used by a user exceeds the allowed quantity of connections for a communication type. In addition, in Step S03, the user device 20 may send a first setting command to the communication server 10, so that the control module 101 of the communication server 10 can execute the user-specified procedure.

The application of the user-specified procedure is introduced as follows. For example, the user device 20 sends a video connection request to the invited client devices 30 and 40 through the communication server 10, expects to set up a video meeting room, and generates the first setting command for restricting the client devices 30 and 40 to enter the video meeting room within 5 minutes after receiving the invitation. Therefore, the control module 101 will control the video server module 103 to prevent the client devices 30 and 40 from entering the video meeting room after 5 minutes. As for another example of the application of the user-specified procedure, the user operates the user device 20 to generate the first setting command to set the time interval of the invitation reminder to 5 minutes, so that the control module 101 sends a reminder message to the client devices 30 and 40 every 5 minutes, so as to remind them of entering the video meeting room.

In Step S04, the communication server 10 receives from another client device a connection request for the user device 20. In Step S02, the user has operated the user device 20 to send the video connection request to the client devices 30 and 40 as the invited objects, set up the first communication connection (at this time, client device 40 has not yet responded to the request) with the client device 30, and generated a first communication state. However, the client device 50 also coincidentally sends a connection request to the user device 20 at this time, such that the communication server 10 receives from the client device 50 the connection request for user device 20.

In another embodiment of the present invention, the user of a client device (e.g., the client device 30) calls the user of the user device 20 and expects to set up a communication connection with the user device 20. Thus, the user of the called end operates the user device 20 to set up a first communication connection with the client device 30 and generate a first communication state. However, the client device 50 also coincidentally sends a connection request to the user device 20 at this time, such that the communication server 10 receives from the client device 50 the connection request for the user device 20.

In Step S05, the communication server 10 automatically executes a processing procedure based on the communication-type quantity table, the first communication state, and a connection request from another client device. In an embodiment of the present invention, the control module 101 of the communication server 10 automatically executes a processing procedure based on the communication-type quantity table, the first communication state, and a connection request from another client device. The processing procedure may include at least one or a combination of switching the communication type of another client device and setting up a second communication connection between the user device and another client device, sending an inquiry message to the user device, sending a reminder message to the user device, sending an inquiry message to another client device, and sending a reminder message to another client device.

For example, the user operates the user device 20 to set up a first communication connection with the client device 30 and generate a first communication state through the communication server 10. The video server module 103 sets up a video communication connection as the first communication connection. In the communication-type quantity table, the user sets the quantity of connections allowed for voice communication to 3 and sets the quantity of connections allowed for video communication to 2. When the client device 50 also sends a request for a video communication connection to the user device 20, the control module 101 of the communication server 10 will automatically execute a processing procedure based on the communication-type quantity table, the first communication state, and a connection request from the client device 50. For example, a query message is sent to the user device 20 to inquire whether the user of the user device 20 intends to integrate the video communication connection of the client device 50 with the existing video communication connection of the client device 30 into the same video meeting room (i.e., the user devices 20, 30, and 50 can communicate with each other through video communication connections). If the user of the user device 20 agrees, the control module 101 will then resend a query message to the client device 50 to inquire whether the user of the client device 50 agrees to set up video communication connections in the same video meeting room with the user device 20 and the client device 30. If the user of the client device 50 agrees, the video server module 103 will set up video communication connections among the user device 20, the client device 30, and the client device 50. It should be noted that the first communication state of the user device 20 should still be represented as using 1 video communication connection if the user device 20 and the client devices 30 and 50 participate in the same video meeting room.

For another example, when the method inquires whether the user of device 20 intends to integrate the video communication connection of the client device 50 with the existing video communication connection of the client device 30 into the same video meeting room, the user of device 20 disagrees to integrate them into the same video meeting room but agrees to set up a video communication connection with the client device 50. Then the control module 101 immediately sets up another video communication connection between the user device 20 and the client device 50 through the video server module 10 (i.e., the user device 20 has set up a second communication connection and generated a second communication state that is stored in the state module 102). It should be understood that the user device 20 has the first and second communication states at this time and that the user device 20 is considered to have used two video communication connections.

In another embodiment of the present invention, the user device 20 has set up a video communication connection with each of the client devices 30 and 50, i.e., at this time, the user device 20 has used two video communication connections. When the client device 40 sends a connection request for a video communication connection to the user device 20, the control module 101 of the communication server 10 can send an inquiry message to the user device 20 to ask the user of the user device 20 to choose from one of the following options: 1) integrating the video communication connection of the client device 40 with the video communication connection of one of the existing client devices 30 or 50 into the same video meeting room; 2) inquiring whether the user of the client device 40 agrees to switch the video communication connection mode to a voice communication connection mode; 3) refusing to answer.

If the user of device 20 chooses option 1, the control module 101 will inquire whether the user of client device 40 agrees to set up a video communication connection with the user device 20 and another client device (e.g., one of the client devices 30 and 50) in the same video meeting room. If the user of client device 40 agrees, a three-party video meeting room will be set up. If the user of device 20 chooses option 2, the control module 101 will send an inquiry message to the client device 40 to inquire whether the user of the client device 40 agrees to switch the connection to a voice communication connection with the user device 20. If the user of the client device 40 agrees, the voice server module 104 will set up a voice communication connection between the user device 20 and the client device 40. If the user of device 20 chooses option 3, the control module 101 will send a reminder message to the client device 40 to inform it that the user device 20 is busy. In addition to the foregoing methods, the control module 101 can also only send a reminder message to the user device 20 to inform it that the client device 40 has requested to set up a video communication connection. It should be understood that the present invention is not limited to the foregoing processing procedure.

When the user operates the user device 20 to provide a communication-object priority table stored in the state module 102 in Step S01, the control module 101 of the communication server 10 can automatically execute a processing procedure based on the communication-type quantity table, the first communication state, the communication-object priority table, and a connection request from another client device in Step S05. The processing procedure may include at least one or a combination of keeping the first communication connection between the user device and the client device and setting up a second communication connection between the user device and another client device, terminating the first communication connection between the user device and the client device and setting up a second communication connection between the user device and another client device, and inquiring whether the user agrees to set up a second communication connection between the user device and another client device.

In an embodiment, the communication-object priority table records items that include client A corresponding to the client device 30, client B corresponding to the client device 40, and client C corresponding to the client device 50. The priority level of client A is high, and the priority levels of client B and C are normal. When the user operates the user device 20 to set up the first communication connection (e.g., a video communication connection) with client B through the client device 40 and the communication server 10 and generate a first communication state and when the communication server 10 receives a connection request from client A's client device 30 (e.g., a video communication connection), the control module 101 of the communication server 10 will automatically execute a processing procedure based on the communication-type quantity table, the first communication state, the communication-object priority table, and a connection request from the client device 30 in Step S05.

Assume that the user device 20 only used 1 video communication connection and that client B's priority level is general at this time. When the communication-type quantity table allows that the quantity of video communication connections is 2, and the communication-object priority table allows that client A's priority level is high, the processing procedure executed by the control module 101 will enable the video server module 103 to keep the first communication connection between the user device and the client device 40 and set up the second communication connection between the user device 20 and the client device 30, thereby allowing the user to first communicate with client A that has the higher priority. For another example, because client A's priority level is high, the processing procedure executed by the control module 101 will enable the video server module 103 to terminate the first communication connection between the user device 20 and the client device 40 and set up the second communication connection between the user device 20 and the client device 30, thereby allowing the user to freely communicate with client A that has the higher priority.

The processing procedure executed by the control module 101 can also display a text window on the user device 20 to inquire whether the user agrees to set up a second communication connection between the user device 20 and the client device 30. This way, the user of the user device 20 can gracefully say goodbye to the client device 40's client B that is communicating with the user and terminate the communication connection, and then set up a communication connection with client A of the client device 30. It should be understood that the processing procedure of the present invention can have different implementations in response to different priorities of different clients and the quantity of present communication connections of the user. The processing procedure of the present invention is not limited to the example described here.

According to the forgoing description, it is understood that the present invention provides a method of automatically processing cross-type communication for multiple connections with a single account. In the method of the present invention, a user only needs a single account to receive multiple connection requests, thereby connecting and communicating with multiple parties. In addition, the method can perform cross-type switching operation between different types of communication. For example, the method helps a user switch from in a voice-type communication mode to in a video-type communication mode. Furthermore, the method can also automatically execute some processing procedures according to parameters preset by the user and the current communication state of the user to provide the user with the convenience of communication before setting up a communication connection or switching the communication connection.

Although various examples of the disclosed technology have been described above, it should be understood that these examples have been presented by examples rather than limited. Likewise, various drawings may depict example architectures or other configurations of the disclosed technology. The drawings may be depicted to assist in understanding the features and functionality that may be included in the disclosed technology. The disclosed technology is not limited to the illustrated example architectures or configurations, but the desired features can be implemented using a variety of alternative architectures and configurations. In fact, it will be obvious to those skilled in the art to know how to implement alternative functionalities, logical or physical partitions and configurations to implement the required features of the technology disclosed in this article. In addition, with regard to flowcharts, operation descriptions, and methodological technical solutions, the order in which the steps are presented herein should not require that the disclosed technologies be implemented in the same order to perform the listed functionality, unless the context dictates otherwise.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. A method of automatically processing cross-type communication for multiple connections with a single account applied to an environment of a communication server, a user device, and a plurality of client devices, the user device and the plurality of client devices electrically connected to the communication server, the method comprising:
   Step (A): providing a communication-type quantity table, wherein the communication-type quantity table includes quantity of connections set by a user, and the quantity of connections corresponds to different communication types;
   Step (B): by the user, operating the user device and a client device to set up a first communication connection and generate a first communication state;
   Step (C): recording the first communication state in the communication server;
   Step (D): by the communication server, receiving from another client device a connection request for the user device; and
   Step (E): by the communication server, automatically executing a processing procedure based on the communication-type quantity table, the first communication state, and the connection request from the another client device,
   wherein, in Step (A), a communication-object priority table is provided, wherein the communication-object priority table comprises priority levels set by the user, and the priority levels correspond to different communication objects,
   wherein, in Step (E), the communication server automatically executes the processing procedure based on the communication-type quantity table, the first communication state, the communication-object priority table, and the connection request from the another client device, and
   wherein the processing procedure comprises at least one or a combination of keeping the first communication connection between the user device and the client device and setting up a second communication connection between the user device and the another client device, terminating the first communication connection between the user device and the client device and setting up a second communication connection between the user device and the another client device, and inquiring whether the user agrees to set up a second communication connection between the user device and the another client device.

2. The method of automatically processing cross-type communication for multiple connections with a single account according to claim 1, wherein a content of the communication-type quantity table comprises at least one or a combination of communication types and quantity.

3. The method of automatically processing cross-type communication for multiple connections with a single account according to claim 1, wherein in Step (B), the user operates the user device to generate a first setting command for setting a user-specified procedure executed by the communication server.

4. The method of automatically processing cross-type communication for multiple connections with a single account according to claim 3, wherein in Step (C), the first setting command is transmitted to the communication server, thereby driving the communication server to execute the user-specified procedure.

5. The method of automatically processing cross-type communication for multiple connections with a single account according to claim 4, wherein the user-specified procedure comprises at least one or a combination of setting an entry time limit for a group meeting room and setting a time interval of an invitation reminder for a group meeting room.

6. The method of automatically processing cross-type communication for multiple connections with a single account according to claim 1, wherein the processing procedure comprises at least one or a combination of switching a communication type of the another client device and setting up a second communication connection between the user device and the another client device, sending an inquiry message to the user device, sending a reminder message to the user device, sending an inquiry message to the another client device, and sending a reminder message to the another client device.

7. The method of automatically processing cross-type communication for multiple connections with a single account according to claim 1, wherein a content of the communication-object priority table comprises at least one or a combination of communication objects and priority levels.

\* \* \* \* \*

UNITED STATES PATENT AND TRADEMARK OFFICE
CERTIFICATE OF CORRECTION

| | | |
|---|---|---|
| PATENT NO. | : 12,200,029 B2 | Page 1 of 1 |
| APPLICATION NO. | : 18/176846 | |
| DATED | : January 14, 2025 | |
| INVENTOR(S) | : Charles Lap San Chan | |

It is certified that error appears in the above-identified patent and that said Letters Patent is hereby corrected as shown below:

On the Title Page

Item (30) insert:
--(30) Foreign Application Priority Data
Mar. 2, 2022 (TW).......................................111107512--

Signed and Sealed this
Eighth Day of April, 2025

Coke Morgan Stewart
*Acting Director of the United States Patent and Trademark Office*